United States Patent

Podojil

[11] 3,935,948
[45] Feb. 3, 1976

[54] STORAGE RACK FOR UNVULCANIZED PNEUMATIC TIRES

[75] Inventor: James W. Podojil, Ravenna, Ohio

[73] Assignee: The Goodyear Tire & Rubber Company, Akron, Ohio

[22] Filed: Oct. 29, 1974

[21] Appl. No.: 518,437

[52] U.S. Cl. .................................................. 211/23
[51] Int. Cl.² ............................................ A47F 7/04
[58] Field of Search ............ 144/288 A; 211/23, 24, 211/57, 59, 123–125

[56] References Cited
UNITED STATES PATENTS

| 1,073,747 | 9/1913 | Eichert | 248/278 X |
| 2,306,540 | 12/1942 | Bales | 211/23 |
| 2,868,389 | 1/1959 | Friend | 211/123 |
| 2,895,618 | 7/1959 | Nathan | 211/123 |
| 3,147,864 | 9/1964 | Sylvester | 211/24 |
| 3,700,113 | 10/1972 | Hager | 211/23 |
| 3,851,846 | 12/1974 | Long | 248/188.2 |

FOREIGN PATENTS OR APPLICATIONS

| 426,727 | 6/1967 | Switzerland | 211/57 |
| 822,313 | 12/1937 | France | 211/123 |

Primary Examiner—Roy D. Frazier
Assistant Examiner—Lawrence J. Staab
Attorney, Agent, or Firm—F. W. Brunner; M. L. Gill

[57] ABSTRACT

A rack for supporting unvulcanized pneumatic tires which rack includes a plurality of horizontally extending prongs, each having an arcuate upper surface when viewed in cross-sectional configuration and including an arcuate upper surface disposed intermediate the ends of the prong which is elevated with respect to the first-mentioned arcuate upper surface. A pneumatic tire is supported on the prong with the beads resting on the lower arcuate surface of the prong on opposite sides of the elevated surface and the elevated surface supporting the tread area.

8 Claims, 5 Drawing Figures

STORAGE RACK FOR UNVULCANIZED PNEUMATIC TIRES

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to the manufacture of pneumatic tires and more particularly to a device for supporting an unvulcanized pneumatic tire.

In the manufacture of pneumatic tires the various components of the tire including various reinforcing components embedded in a matrix of unvulcanized rubber or other unvulcanized rubberlike material are assembled on a building form. The tire at this stage of manufacture comprises what is generally referred to as an unvulcanized tire carcass. For purposes of simplicity an unvulcanized tire carcass will be referred to hereinafter as a carcass. The carcass is then transferred to a shaping and vulcanizing press in which it is shaped to the final form and vulcanized. The unvulcanized tire, therefore, must be transported and stored for some period of time.

The present invention relates to the transportation and storage of carcasses between the building and vulcanizing stages. The carcass generally does not have enough strength or rigidity to maintain the shape in which it was built on the building form. Such carcasses, therefore, have a tendency to sag or droop under their own weight and become distorted. A distorted carcass can result in non-uniformities in the tire when it is shaped and vulcanized in a press.

This problem is more acute with respect to the so-called drum built or pulley band radial ply tires. These radial tires are characterized by the fact that they are completely built in a generally cylindrical configuration and only brought to the torus or tire shape in the curing press. Such a tire is disclosed in U.S. Pat. No. 3,409,492. These tires generally have even less rigidity in the unvulcanized state than do bias or bias belted tires, and, therefore, have a greater tendency to lose their shape due to sagging or drooping under their own weight during the transportation and storage process.

SUMMARY OF THE INVENTION

The present invention provides a device or means to support a carcass in which device a pair of spaced apart arcuate surfaces are provided to support the bead rings of the carcass and a second arcuate surface is provided between the pair of previously-mentioned arcuate surfaces and at a higher elevation with respect to the first pair of surfaces to support the central portion of the carcass.

A tapered or conical transition portion is provided intermediate each surface of the pair of surfaces which supports the beads and the elevated surface to facilitate placing the carcass on and removing the carcass from the support without damaging the carcass.

An object of the present invention is to provide a device for supporting an unvulcanized tire carcass in such a manner as to avoid significant distortion under its own weight. A further object is to provide such a device on which an unvulcanized tire can be conveniently placed and removed without the danger of causing damage to the tire.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

DETAILED DESCRIPTION OF THE INVENTION

Figure 1:
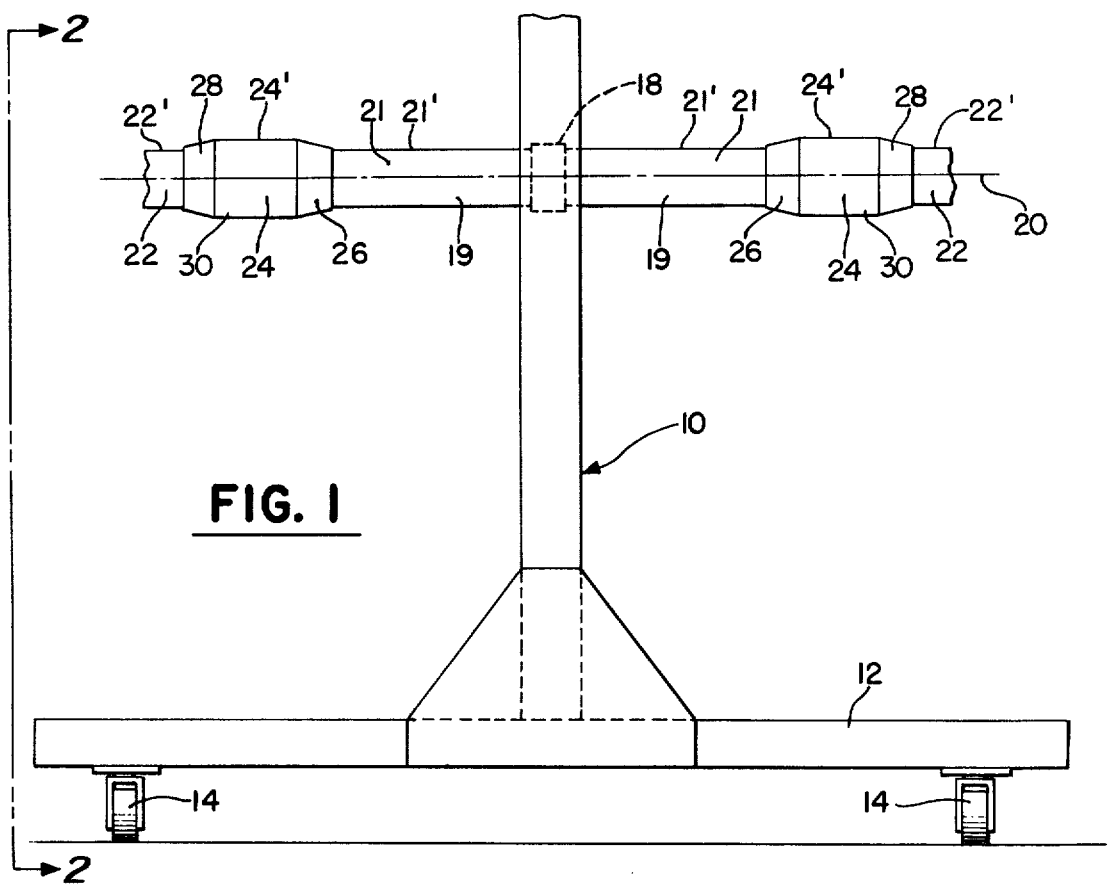
FIG. 1 is a fragmentary elevational view of an unvulcanized tire storage rack incorporating the present invention.
Figure 2:
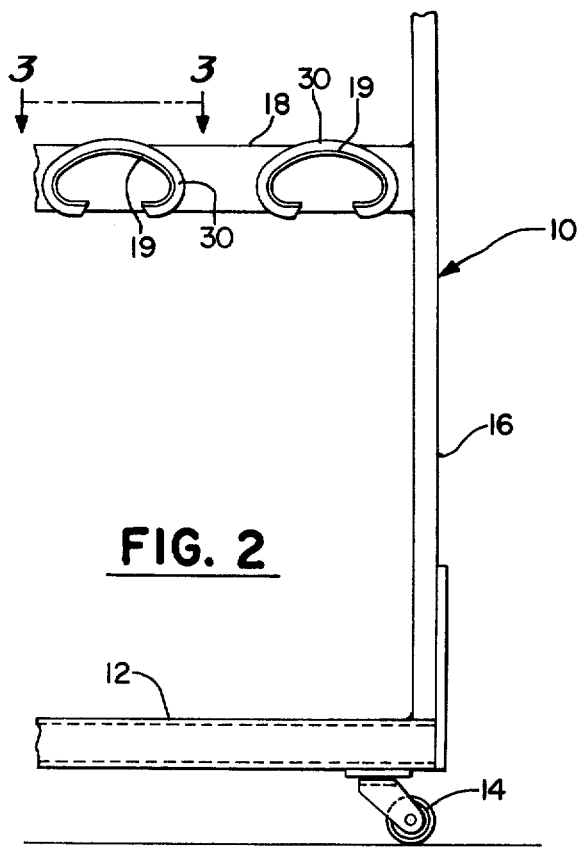
FIG. 2 is a fragmentary view of the storage rack of FIG. 1 taken substantially along lines 2—2 of FIG. 1.

With reference to the drawings and in particular FIGS. 1 and 2 there is illustrated a portable tire storage rack 10 including a frame which in the embodiment illustrated comprises a horizontal base portion 12 supported on a series of rollers 14, and an upstanding pedestal or support 16 rigidly mounted on the base 12 which rigidly supports a plurality of horizontally extending arms 18. A plurality of horizontally extending prongs 19 which are generally parti-elliptical in cross-section extend perpendicularly from the arms 18 and are rigidly fixed thereto. For purposes of establishing a reference line, an axis 20 extending lengthwise of each prong 19 will be referred to as the long axis 20. Cross-sectional views will be those views taken in planes perpendicular to the long axis 20.

Each prong 19 has a pair of spaced apart profiled surfaces 21 and 22 which are of a similar parti-elliptical cross-sectional configuration and in axial alignment with respect to the long axis 20 of the prong 19. There is a third profiled surface 24 which is parti-elliptical and is disposed intermediate the surfaces 21 and 22. All three parti-elliptical surfaces 21, 22 and 24 are axially aligned with respect to the long axis 20 of the prong 19 and have an arcuate upper surface 21', 22' and 24' for supporting a tire which is formed by a major arc of the elliptical contour.

In addition there are a pair of tapered surfaces 26 and 28 on axially opposite sides of the raised surface 24 which provide a smooth transition from the surface 24 to the pair of surfaces 21 and 22 on the opposite side thereof. These tapered surfaces make it easy to slip a tire over the prong and raise surface 24 without the danger of being damaged by corners or changes in elevation of the prong 19.

Figure 3:
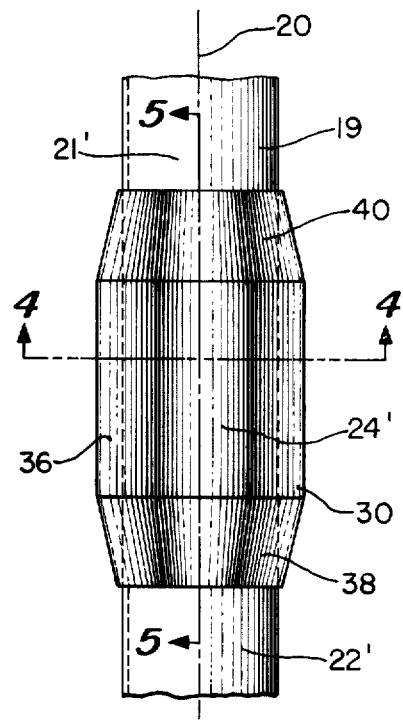
FIG. 3 is a view of a portion of the storage rack of FIG. 1 taken substantially along the line 3—3 of FIG. 2.
Figure 4:
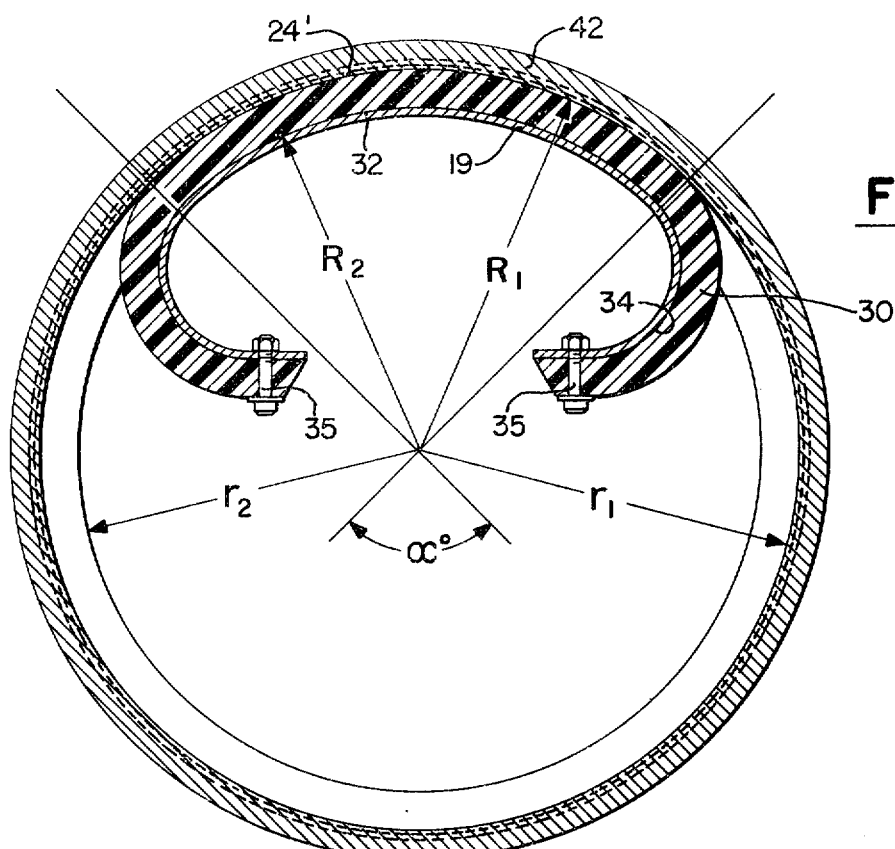
FIG. 4 is a cross-sectional view of the storage rack of FIG. 1 taken substantially along line 4—4 of FIG. 3 and further illustrating a tire supported thereon.
Figure 5:
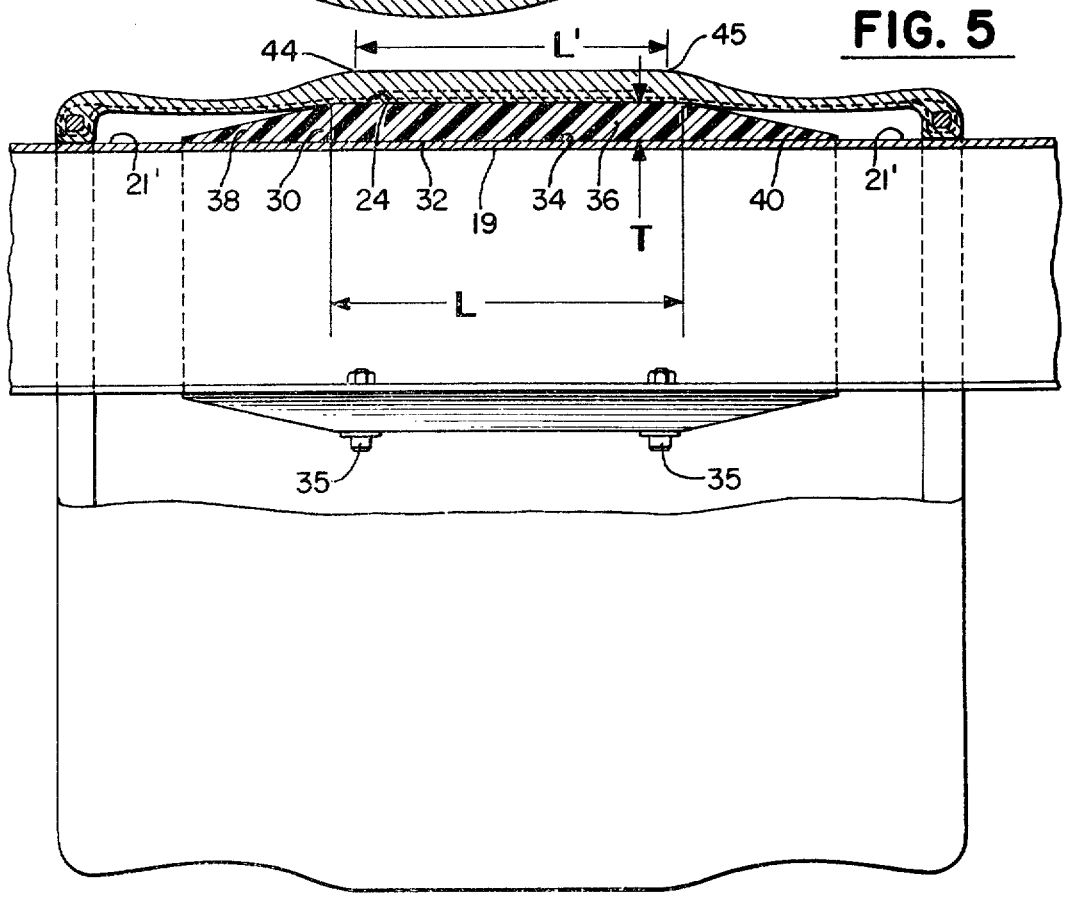
FIG. 5 is a cross-sectional view of the storage rack of FIG. 1 taken substantially along line 5—5 of FIG. 3 and illustrating the tire supported thereon.

More particularly and with respect to FIGS. 3, 4 and 5, in the particular embodiment illustrated the surfaces 24, 26 and 28 are provided by the addition of an adapter 30 which is receivable on the prong 19. The adapter 30 has an internal configuration or surface 32 which conforms to the outer surface 34 of the prong 19 such that it can be slipped neatly over the prong 19.

The adapter 30 is fixed on the prong 19 by means of bolts 35 or other suitable means.

As seen in FIG. 4, the internal cross-sectional contour of both the adapter 30 and the prong 19 are of a generally elliptical shape and thus the adapter 30 when slipped over the prong 19 is fixed relative to rotation about the long axis of the prong 19.

In the particular embodiment illustrated the adapter 30 is conveniently made of a plastic material and it includes an axial central portion 36 and a pair of tapered or parti-conical end portions 38 and 40. The end portions 38, 40 provide a smooth transition between the central portion 36 and the surfaces 21, 22 and thus avoids the danger of damage to a carcass 42 when putting it on and taking it off of the prong 19. The central portion 36 has a thickness T which substantially corresponds to the difference between the inside radius $r_1$ of the tread portion and the inside radii $r_2$ of the bead portions when the carcass 42 is in the configuration in which it was built. It will be appreciated, of course, that slight variations in the thickness T can be tolerated. However, the thickness T should be equal to within 10 percent of the difference between the inside bead radius $r_2$ and the inside tread radius $r_1$.

Particularly with reference to FIG. 4, the upper surface 24' of the adapter 30 and the adjacent upper surfaces 21', 22' of the prong 19 each have a radius $R_1$ and $R_2$ respectively which approximate the radius of the respective internal surfaces of the central portion of the tread and bead portions of the carcass 42. These radii, however, need not be precisely the same as that of the tire. For example, the same prong and adapter arrangement can be used for 14- and 15-inch rim diameter tires. Thus, for example, the radius $R_2$ of the upper surface of the prong 19 would be 7½ inches and would accommodate both the 14- and 15-inch diameter tires. Preferably, each radii of the respective upper surfaces 21', 22' and 23' should be within 1 inch of the radius of the portion of the tire it is to support. Further, the radius $R_1$ and $R_2$ of the ellipse extends over an arc of at least 60° and preferably at least 85° in order to provide a sufficient support area to maintain the proper curvature over a significant portion of the carcass 42.

The axial length L of the central, upper support surface 24' should be at least as great as the axial length L' of the tread portion of the carcass 42. For purposes of determining the axial length L' of the tread the axially outer extremities 44 and 45 of the tread will be considered the points at which the thickness of the uncured tread rubber begins to decrease.

The bead and tread areas are thus supported over a substantial arc and in proper concentric positions with respect to each other and the tread area is supported throughout its axial length. Being so supported the carcass 42 will remain substantially in the shape in which it was built and will not sag or droop excessively under its own weight.

In order to prevent the carcass from sticking to the adapter, the adapter may be provided with a release agent which prevents the adhesion of the uncured rubber to the surface thereof.

Further, while the specific embodiment illustrated included a rack 10 on which the prongs 19 were supported ultimately by a base portion on rollers, it will be appreciated that the prongs 19 could be supported by any other suitable means.

While certain representative embodiments and details have been shown for the purpose of illustrating the invention, it will be apparent to those skilled in this art that various changes and modifications may be made therein without departing from the spirit or scope of the invention.

What is claimed is:

1. A rack for supporting an unvulcanized pneumatic tire said rack comprising a frame, a horizontally extending prong having a long axis and supported at one end on said frame, said prong having a first upper surface which is generally elliptical in cross-sectional configuration, a pair of second upper surfaces each with a generally elliptical cross-sectional configuration disposed on opposite sides of said first upper surface and at a lower elevation with respect to said first upper surface, and a tapered surface on axially opposite sides of said first upper surface forming smooth transitions between said first upper surface and said second upper surfaces, all of said upper surfaces being arranged in axial alignment with respect to said prongs.

2. A rack as claimed in claim 1 wherein the arc formed by the first and second upper surfaces extends over an arc of at least 60 degrees as viewed in sections perpendicular to the long axis and each arc has a radius of curvature equal to within one inch of the as-built radius of curvature of the respective portion of a tire to be supported by each major arc.

3. A rack as claimed in claim 2 wherein said arc is at least 80° and said first upper surface extends in axial directions for a distance at least equal to the axial length of the tread portion of the carcass to be supported on said prong.

4. A rack as claimed in claim 3 wherein said first upper surface is elevated with respect to said second upper surface a distance equal to within 10 percent of the difference between the as-built inside radii of the bead portions and tread portion of the carcass to be supported on said prong.

5. A rack for supporting an unvulcanized pneumatic tire said rack including a horizontally extending prong with a generally elliptical upper surface as viewed in cross-sections, the improvement comprising an adapter mounted on said prong and intermediate the ends thereof to provide an generally elliptical upper surface which is elevated with respect to the arcuate upper surfaces of said prong on axially opposite sides of said adapter said adapter including tapered end portions to provide a smooth transition between the upper surface of said prong and said adapter.

6. The improvement as claimed in claim 3 wherein said arcuate upper surface of said adapter extends over an area of at least 60° and has a radius of curvature equal to within one inch of the as-built radius of curvature of the central portion of the tire to be supported on said rack.

7. The improvement as claimed in claim 6 wherein said arc is at least 80° and said arcuate upper surface of said adapter extends in axial directions for a distance at least equal to the axial length of the tread portion of the carcass to be supported on said prong.

8. The improvement as claimed in claim 7 wherein said arcuate surface of said adapter is elevated with respect to the arcuate upper surface of said prong a distance equal to within 10 percent of the difference between the as-built inside radii of the bead portion and tread portions of the carcass to be supported on said prong.

* * * * *